US007523256B2

(12) United States Patent
Gallagher et al.

(10) Patent No.: US 7,523,256 B2
(45) Date of Patent: Apr. 21, 2009

(54) SYSTEM AND METHOD FOR SCHEDULING DISK WRITES IN AN APPLICATION SERVER OF TRANSACTIONAL ENVIRONMENT

(75) Inventors: William John Gallagher, Easton, PA (US); Dean Bernard Jacobs, Berkeley, CA (US); Anno R. Langen, Berkeley, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 269 days.

(21) Appl. No.: 11/343,979

(22) Filed: Jan. 30, 2006

(65) Prior Publication Data

US 2007/0005882 A1    Jan. 4, 2007

Related U.S. Application Data

(60) Provisional application No. 60/690,793, filed on Jun. 15, 2005.

(51) Int. Cl.
*G06F 13/00* (2006.01)
(52) U.S. Cl. .......................... 711/112; 707/202; 707/204
(58) Field of Classification Search ........................ None
See application file for complete search history.

(56) References Cited

U.S. PATENT DOCUMENTS 5,914,916 A * 6/1999 Totsuka et al. ............. 369/30.1

| 7,277,984 | B2* | 10/2007 | Ghosal et al. ............... 711/112 |
| 2003/0217080 | A1 | 11/2003 | White et al. |
| 2004/0128459 | A1* | 7/2004 | Chanda et al. .............. 711/167 |
| 2005/0078399 | A1* | 4/2005 | Fung et al. ..................... 360/69 |
| 2006/0190681 | A1* | 8/2006 | Geerlings .................... 711/112 |

OTHER PUBLICATIONS

International Search Report and Written Opinion for PCT/US06/03357, Oct. 2, 2007, 7 pages.

* cited by examiner

*Primary Examiner*—Don Wong
*Assistant Examiner*—Andalib F Lodhi
(74) *Attorney, Agent, or Firm*—Fliesler Meyer LLP

(57) ABSTRACT

A system and a method for scheduling disk writes for use with an application server, transactional system, or other server. The disk scheduler and method is independent of the underlying operating system and the disk hardware. This allows it to be used without porting to the various settings in which application server might be deployed. In some embodiments, a high-performance, transactional filestore is also provided to minimize the latency of small, synchronous writes to disk. The implementation uses a log-structured file system combined with disk scheduling. By relaxing the requirement that log records be physically contiguous, every modification to the disk can be scheduled.

16 Claims, 4 Drawing Sheets

Method for scheduling disk writes

SYSTEM FOR SCHEDULING DISK WRITES

Method for scheduling disk writes

The effect of skipping blocks.

Layout of Flush Records

Commit time as a function of free space

Workflow Application Performance

SYSTEM AND METHOD FOR SCHEDULING DISK WRITES IN AN APPLICATION SERVER OF TRANSACTIONAL ENVIRONMENT

CLAIM OF PRIORITY

This application claims the benefit of U.S. Provisional Application entitled "SYSTEM AND METHOD FOR SCHEDULING DISK WRITES IN AN APPLICATION SERVER OR TRANSACTIONAL ENVIRONMENT"; Application No. 60/690,793; filed Jun. 15, 2005; and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to application servers, databases, messaging systems and other transaction-based systems, and particularly to a system and method for scheduling disk writes in such systems.

BACKGROUND

Application servers provide an infrastructure for building distributed transaction processing applications, such as transactional applications, databases, messaging systems (including the Java Messaging System, JMS), conversation state systems, and web services. In a typical multi-tier architecture, such as that described in "Distributed computing with BEA WebLogic server", by D. Jacobs, in Proceedings Conference on Innovative Data Systems Research, Asilomar, Calif., 2003, incorporated herein by reference, clients submit requests to a cluster of application servers which act as a front-end to a collection of databases. In most instances, transactional data is maintained in the databases and is accessed from the application servers as requests arrive. However, this arrangement is less than ideal for data such as messages and business workflow state which are used only by the application servers rather than being shared with other enterprise applications; data which is relatively transient in that it is processed by the application servers and then discarded; or data which is accessed in limited ways, for example, by key or through a sequential scan, rather than through arbitrary queries.

Performance and scalability of the system can be dramatically increased by distributing such data across transactional file stores, each of which is bound to an instance of the application server in the cluster. This architecture moves the data closer to where it will be processed, eliminates contention for the data, and permits optimizations around the specific access patterns. Moreover, tight integration of the filestore with the application server simplifies management and administration of the overall system. Specialized file-based message stores are common for all of these reasons, and can be generalized to include other kinds of data. In particular, placing business workflow state in the same store as its associated messages eliminates the need for two-phase commit between the messaging system and databases.

A factor that must be considered with such systems is that transactional applications, such as databases and messaging systems, make extensive use of synchronous writes. In this process, data is transferred to the physical disk medium before the caller is notified of the completion of the operation. Synchronous writes present a significant obstacle to system performance because, unlike other disk operations, their cost cannot be reduced by caching. The cost of a synchronous write is generally dominated by the time it takes to position the disk head, especially in the case of the small writes that are common in transactional applications. This rotational latency means that transactional writes to disk are a potential bottleneck to system performance.

Disk schedulers attempt to reduce the cost of transaction applications and synchronous writes by selecting blocks that are about to rotate under the disk head. Traditional disk schedulers are implemented at a low-level, in a device driver or disk firmware, and schedule writes to the entire disk on behalf of the operating system. They generally rely on information about drive geometry that is obtained in platform-specific ways. However, one of the problems with the traditional approach to providing file stores and disk schedulers are that they are inherently platform-specific. If the application server is to be used in a different hardware environment or in a different usage setting then it must be ported to that platform or setting. This is prohibitive in terms of development and maintenance costs. What is needed therefore, is a platform-independent means of providing a file store or disk scheduler. Such platform independence would allow an application server to be optimally used in different hardware and usage settings without the need for expensive development, porting, and maintenance costs.

SUMMARY

Described herein is a disk scheduler, and a high-performance transactional filestore for use with distributed transaction processing applications, such as transactional applications, transactional databases, messaging systems, and application servers. Application servers typically allow messages and business workflow state to be stored in either a filestore or a relational database. In accordance with an embodiment of the present invention, the disk scheduler and/or file store are designed to minimize the latency of small, synchronous writes to disk. Traditional disk schedulers are implemented at a low-level, in a device driver or disk firmware, and generally rely on information about drive geometry that is obtained in platform-specific ways. In contrast, the disk scheduler described herein is completely independent from the underlying operating system and disk hardware. In accordance with an embodiment, the disk scheduler operates within a user-level application, obtains information about the drive's geometry by monitoring the behavior of the disk at runtime, and schedules writes to blocks in an ordinary file. Such platform-independence is essential for practical reasons, including porting the solution to the wide variety of settings in which application servers are employed.

DETAILED DESCRIPTION

Figure 1:
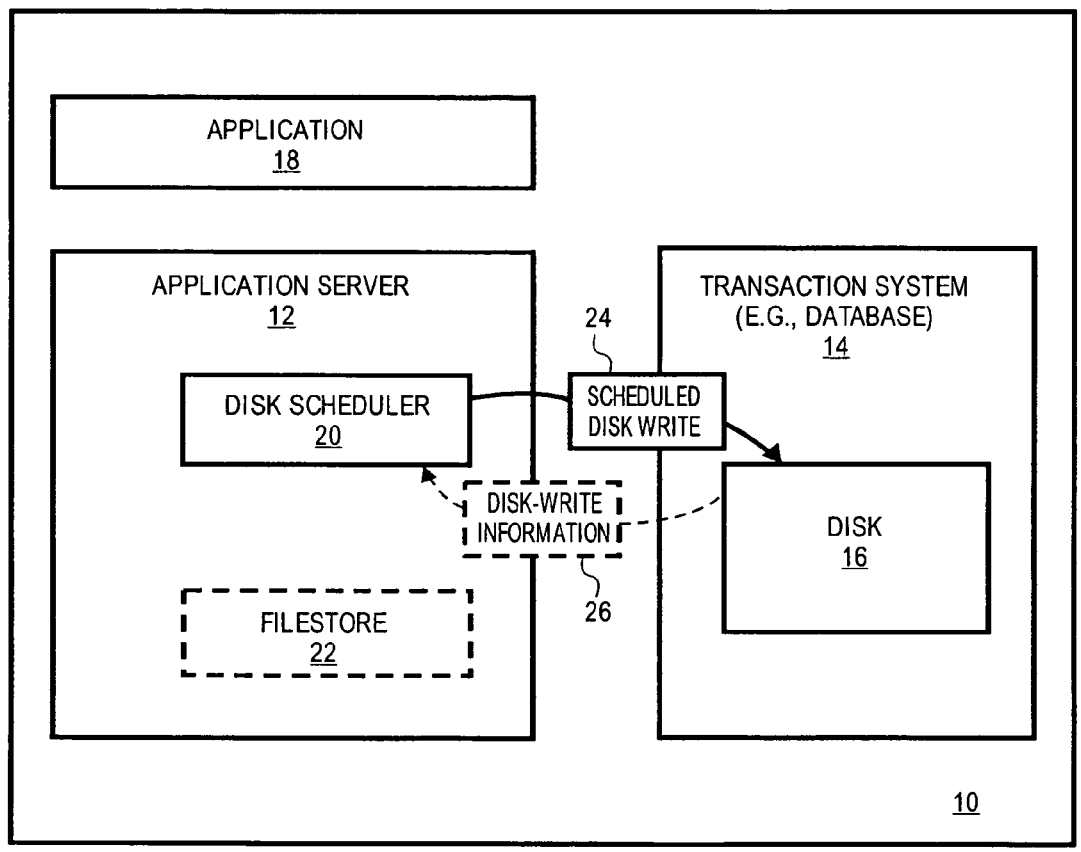
FIG. 1 shows an illustration of a system for scheduling disk writes in accordance with an embodiment of the invention.

Described herein is a disk scheduler, and a high-performance transactional filestore for use with distributed transaction processing applications, such as transactional applications, transactional databases, messaging systems, and application servers. Particular embodiments of the disk scheduler and/or transaction filestore may be used with the WebLogic Server™ from BEA Systems, Inc., or with other application servers. Application servers such as the WebLogic Server typically allow messages and business workflow state to be stored in either a filestore or a relational database. In accordance with an embodiment of the present invention, the disk scheduler and/or file store are designed to minimize the latency of small, synchronous writes to disk. These small synchronous writes present a significant obstacle to performance in transactional systems, as have been described in "Free Transactions with Rio Vista", by D. E. Lowell and P. M. Chen, in Proceedings 16th ACM Symposium on Operating Systems Principles, Oct. 1997, incorporated herein by reference. In accordance with one embodiment the technique combines eager writing, wherein a disk scheduler selects blocks that are about to rotate under the disk head, with a log-structured file system, where all modifications to the disk are realized as writes to a log. By relaxing the requirement that log records be physically contiguous, every modification to the disk can take advantage of eager writing. Additional information about disk heads, log-structured files systems, and eager writing can be found respectively in "Mime: a High Performance Parallel Storage Device with Strong Recovery Guarantees", by C. Chao, R. English, D. Jacobson, A. Stepanov, and J. Wilkes, Tech. Rep. HPL-CSP-92-9 rev 1, Hewlett-Packard Company, Palo Alto, Calif., Mar. 1992; "The Design and Implementation of a Log-Structured File System", by M. Rosenblum and J. Ousterhout, in Proceedings of the 13th Symposium on Operating Systems Principles, Oct. 1991; and "Virtual Log Based File Systems for a Programmable Disk", by R. Y. Wang, T. E. Anderson, and D. A. Patterson, in Proceedings of the 3th Symposium on Operating Systems Design and Implementation, February 1999, each of which are incorporated herein by reference.

Traditional disk schedulers are usually implemented at a low-level, in a device driver or disk firmware, and schedule writes to the entire disk on behalf of the operating system. These traditional disk schedulers generally rely on information about drive geometry that is obtained in platform-specific ways. In contrast, the disk scheduler technique described herein is completely independent from the underlying operating system and disk hardware. In accordance with an embodiment, the disk scheduler operates within or with a user-level application, obtains information about the drive's geometry by monitoring the behavior of the disk at runtime, and schedules writes to blocks accordingly. Such platform-independence is essential for practical reasons, including porting the solution to the wide variety of settings in which application servers are employed.

In accordance with an embodiment the implementation of a log-structured file system is tailored for transient data. Since data blocks rapidly become unused and the system aggressively frees them, it is unnecessary to perform data compaction. In addition, since the overall volume of data is relatively small, mapping structures for disk addresses can be maintained in-memory and filestore recovery can be performed by scanning the entire file.

Synchronous Writes

Transactional applications such as databases and messaging systems make extensive use of synchronous writes, wherein data is transferred to the physical disk medium before the caller is notified of the completion of the operation. Synchronous writes present a significant obstacle to performance because, unlike other disk operations, their cost cannot be reduced by caching. The cost of a synchronous write is generally dominated by the time it takes to position the disk head, especially for the small writes that are common in transactional applications. Disk schedulers attempt to reduce this cost by selecting blocks that are about to rotate under the disk head.

As described above, traditional disk schedulers are implemented at a low-level, in a device driver or disk firmware, and schedule writes to the entire disk on behalf of the operating system. However, in accordance with an embodiment of the present invention, the disk scheduler is independent of the underlying operating system and the disk hardware. FIG. 1 shows an illustration of a system for scheduling disk writes in accordance with an embodiment of the invention. As shown in FIG. 1, the system 10 includes a server 12 (which may also be or include an application server, such as a WebLogic Server), and a transactional-based system or application 14. The transactional-based system or application can be a database, web service, conversational application, messaging, JMS or a similar application. The system also includes, or allows access to a disk device 16, such as a disk drive, which in turn may have many disk surfaces or platters. User applications 18 make requests via the application server to read or write data from the disk. If one were to use a traditional approach, then since many servers, including Java-based servers, cannot access disk information directly, a write to a particular block on the disk might require a full rotation of the disk surface. However, in accordance with an embodiment of the invention, a disk scheduler 20 schedules writes to the disk in accordance with a disk scheduling algorithm, described in further detail below. As the application executes and needs to write to the disk, the disk scheduler schedules those writes 24 for optimal performance. Information 26 about each disk write is used to optimize the performance of the disk schedule overtime so that the ability of the system to make scheduled writes becomes increasingly more optimal.

Optionally, a file store 22 can be used with the disk scheduler. In accordance with this embodiment, the disk scheduler is designed to operate within the user-level application and schedules writes to blocks in an ordinary file. The use of a file store with the disk scheduler is also described in further detail below.

Figure 2:
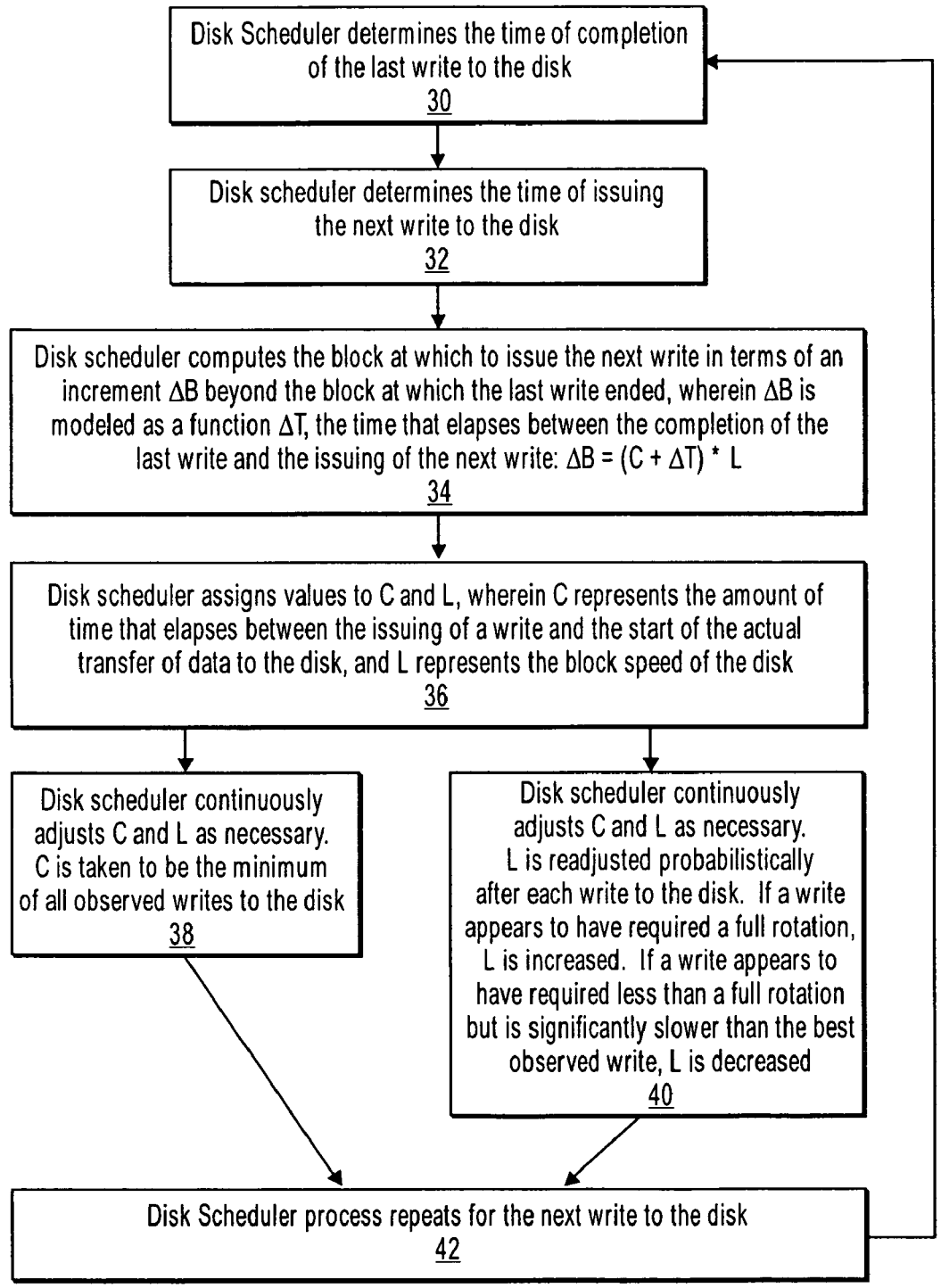
FIG. 2 shows a flowchart of a process of scheduling disk writes in accordance with an embodiment of the invention.

FIG. 2 shows a flowchart of a process for scheduling disk writes in accordance with an embodiment of the invention. A disk-scheduling algorithm assumes sequential logical blocks in the file are, for the most part, mapped to sequential physical blocks on the disk medium. Thus, for example, the underlying file system should itself not be log-structured. Moreover, high levels of external fragmentation of the file reduce performance. The algorithm also assumes that the disk is largely dedicated to a single process that is running the disk scheduler. Information about the drive's geometry is derived by monitoring the behavior of the disk at runtime, and interleaved accesses from other processes may reduce the accuracy of this information. Positioning the disk head for a write may entail a seek, to move to the desired track, and rotation, to spin the platter to the desired block on that track. In accordance with an embodiment the disk scheduler ignores seeks, modeling the disk as a single large track, and attempts to choose blocks so as to minimize rotational latency. The rationale for this approach is because disk scheduling is most useful only when the system is heavily loaded, i.e., when there is a series of consecutive writes that keep the disk busy. In this instance, many writes occur in sequence to the same track and seeks rarely occur in comparison. Thus seeks can be ignored without significantly affecting performance.

As shown in FIG. 2, in step 30, the disk scheduler determines the time of completion of the last writes to the disk. In step 32, the disk scheduler determines the time of issuing the next write to the disk. This provides a value for $\Delta T$, the time that elapsed between the completion of the last write and the issuing of the next write. In step 34, the disk scheduler computes the block at which to issue the next write in terms of an increment $\Delta B$ beyond the block at which the last write ended. The value for $\Delta B$ is then modeled as a linear function of $\Delta T$. In accordance with an embodiment, the value for AB is governed by the equation:

$$\Delta B = (C + \Delta T) * L$$

where the variables C and L are factors in the linear model. In step 36, the disk scheduling algorithm assigns values to C and L based on the following physical intuitions: (1) the variable C represents the amount of time that elapses between the issuing of a write and the start of the actual transfer of data to the disk. As such, it includes components such as the command overhead of the disk, or the length of time it takes for the disk to respond to a write request. The sum of C and $\Delta T$ represents the total time that elapses between the end of one data transfer and the beginning of the next; (2) L represents the block speed of the disk, i.e., the number of blocks that pass under the disk head per unit of time. The product of these quantities gives the incremental position of the disk head at the start of the data transfer of the next write. While $\Delta T$ is measurable for each write, the quantities represented by C and L are not. Moreover, they vary over time for a variety of reasons. For example, the block speed of the disk is affected by the track being used: tracks towards the outside of the platter have more blocks and thus a higher block speed.

In steps 38 and 40, the disk scheduling algorithm continuously adjusts C and L. In step 38, C is taken to be the minimum of all observed writes to the disk. It is initially set to a large number, decreases overtime, and levels off. This warm-up period can be eliminated after the first time by caching the value in the file store. During use, the value of C may approach or equal the actual command overhead for that disk. In step 40, the value of L is readjusted probabilistically after each write to the disk. If a write appears to have required a full rotation, then L may be increased. If a write appears to have required less than a full rotation but is significantly slower than the best observed write, then L may be decreased. In step 42, the process repeats for the next write to the disk.

Figure 3:
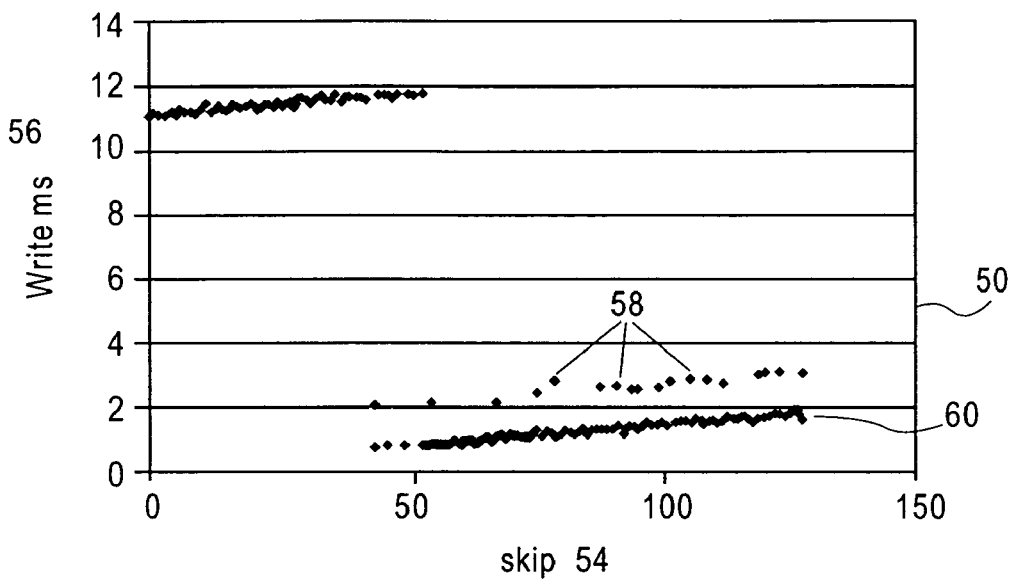
FIG. 3 shows an illustration of the effect of skipping blocks in accordance with an embodiment of the invention.

The nature of the disk scheduling problem and the advantages provided by the invention is demonstrated by the experimental results illustrated in FIG. 3, which shows the effect of skipping blocks in accordance with an embodiment of the invention. As shown in FIG. 3, a series of small writes 58 are sent to a disk, modeling the case in which the system is heavily loaded. Each point 58 on the graph 50 represents a single write. Each write is spaced apart from the previous write by some number of blocks, as specified on the horizontal axis 54, and takes some number of milliseconds to complete, as specified on the vertical axis 56. While there are some extreme outliers, due to irregular disk or operating system activities, most of the writes occur on sloping lines 60 at the bottom of the graph. The optimal number of blocks to skip occurs at the bottom of each line. The upward slope of each line is caused by the additional rotational latency introduced by writing beyond the optimal location. This test demonstrates that it is better to skip more blocks and to incur a small amount of additional rotational latency, than to skip fewer blocks and incur full rotations of the disk.

As described above, the disk scheduler computes the block at which to issue the next write in terms of an increment $\Delta B$ beyond the block at which the last write ended, with the value $\Delta B$ modeled as a linear function of $\Delta T$, and the value L readjusted probabilistically after each write to the disk. If a write appears to have required a full rotation, L may be increased—the effect here is to crawl up the sloping line in FIG. 3. If a write appears to have required less than a full rotation but is significantly slower than the best observed write, L may be de-creased—the effect here is to crawl down the sloping line in FIG. 3. As an initial example, the efficacy of this algorithm can be demonstrated by re-running the test of FIG. 3 with disk scheduling turned on. After an initial warm up period, an average write time of 1.4 ms was achieved with 96% of the writes having skips from 55-57.

Filestore

In accordance with an embodiment, the system also includes a filestore. A filestore takes as input sequences of Create, Read, Update, or Delete operations, each associated with a local transaction, and performs them atomically with read repeatable isolation (no dirty reads, reads are repeatable, as described in "Transaction Processing: Concepts and Techniques", by J. Gray and A. Reuter, Morgan Kaufman, 1993, incorporated herein by reference). Multiple threads may be involved in multiple concurrent local transactions. A single thread is used to perform all disk writes. Transactions that arrive while the I/O thread is busy are aggregated into one boxcar and committed as a group. Updates are translated into Delete/Create pairs, thus the overall task of the I/O layer is to atomically write out sequences of Create and Delete operations. The I/O layer makes calls to the disk scheduler to pro-vide information about the disk's behavior and to obtain block numbers at which to perform writes. All operations, including creates, deletes, and bookkeeping, are carried out by writing to fresh blocks, which takes maximum advantage of the disk scheduler. In accordance with an embodiment, the system uses a log-based algorithm where log records are specially tagged so they do not need to be written out sequentially to support recovery. The sequence of operations in a transaction is written out as a contiguous sequence of flush records. Each flush record contains a subset of the operations in the transaction. A flush record may occupy one disk block and contain multiple small operations or it may span several disk blocks and contain a single large operation. The use of multiple flush records allows disk blocks to be reclaimed at a finer granularity than entire transactions. For example, if a flush record contains create operations for two objects, then the associated block can be reclaimed as soon as those objects are deleted (or updated) regardless of the status of other operations in the transaction.

Figure 4:
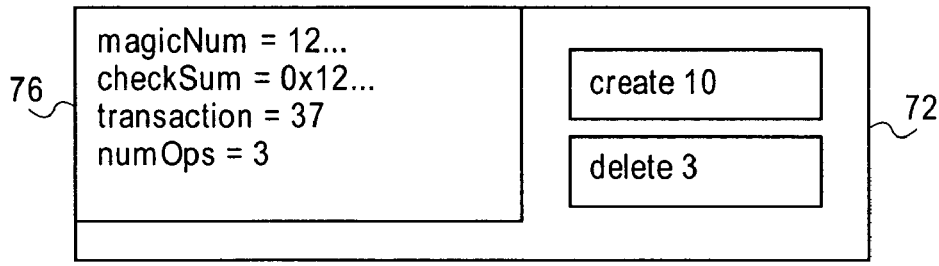
FIG. 4 shows an illustration of the layout of flush records in accordance with an embodiment of the invention.
Figure 4:
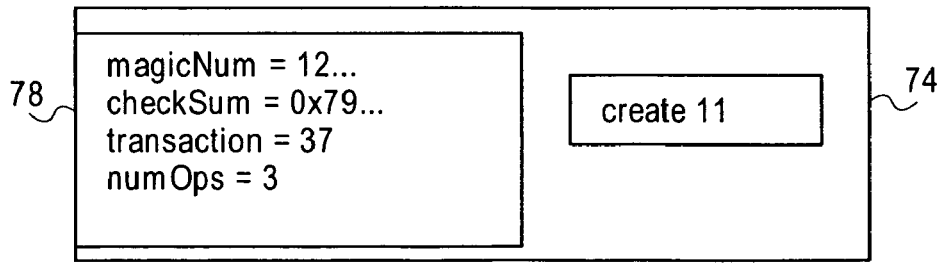

In accordance with an embodiment, the filestore maintains two in-memory data structures. The first is a map from object identifiers, which are generated by the create operation, to the disk addresses where those objects reside. This structure is used to locate objects for reading. The second is a heap that tracks the status of each block on disk. This structure is used to find free blocks and to reclaim blocks whose operations have been superceded. Each flush record contains a header with four fields that are used during crash recovery. FIG. 4 shows an illustration of the Layout of Flush Records 76, 78 in accordance with an embodiment of the invention. The first field is a magic number that signifies whether the block contains valid data. The second field is a check sum across the flush record. The third field is a transaction number: transactions are sequentially numbered in increasing order. The fourth field specifies the number of operations that are contained in the transaction. Crash recovery entails reconstructing the in-memory data structures as follows. The blocks in the file are scanned from beginning to end. Each block 72, 74 with a valid magic number is analyzed for data. The set of flush records associated with each transaction number is collected. If any of the flush records fails to check sum, the transaction is discarded. For the transaction with the highest number, which is the only one for which a partial write could have occurred, the sum of the number of operations in all of its flush records is compared with the number specified in the flush record headers. If these numbers do not match, the transaction is discarded. The remaining blocks are guaranteed to contain valid data. The status of each identifier is derived from the highest numbered transaction that refers to it. This recovery algorithm can be run incrementally, i.e. without reading all blocks into memory at the same time.

Benchmark Results

Figure 5:
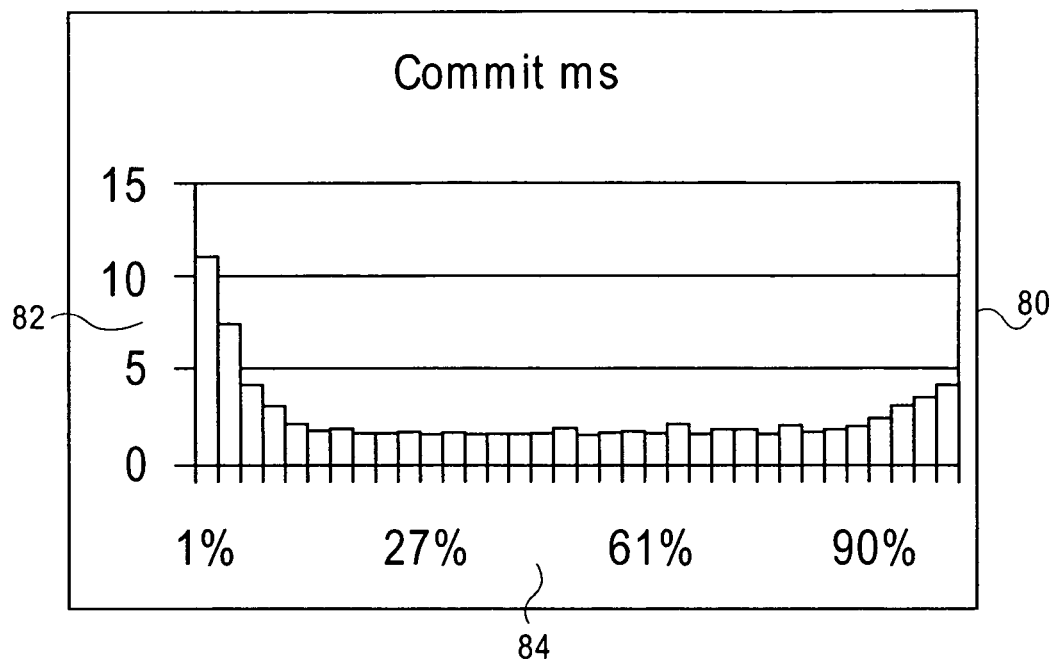
FIG. 5 shows a graph of commit time as a function of free space in accordance with an embodiment of the invention.

This section presents an experimental analysis of the performance of the filestore using micro- and macro-benchmarks. A first benchmark, illustrated in FIG. 5, shows the performance of the filestore as a function of the amount of free space in the file. This is of interest because, as the file fills up, the disk scheduler must settle for less and less optimal blocks. This benchmark was run on a single host machine using a Hitachi DK23FB-60 disk which spins at 5400 rpm. A collection of client threads subject the filestore to a constant stream of write transactions, each of which creates a 10 byte entry. These entries are never deleted and the file gradually fills up. FIG. 5 shows these results as a graph of commit time as a function of free space in accordance with an embodiment of the invention. The vertical axis 82 shows the commit time in milliseconds and the horizontal axis 84 shows the percentage of the file which is full. Each bar on the graph represents the average commit time across 1000 consecutive transactions. During the initial warm-up period, commit times are around 11 ms, corresponding to a full rotation of the disk. The commit times rapidly decrease to less than 2 ms for most of the run. At near file capacity, there is a degradation to around 4 ms. Note that sequential writes to the blocks in a file will incur the full rotational delay of 11 ms every time.

Figure 6:
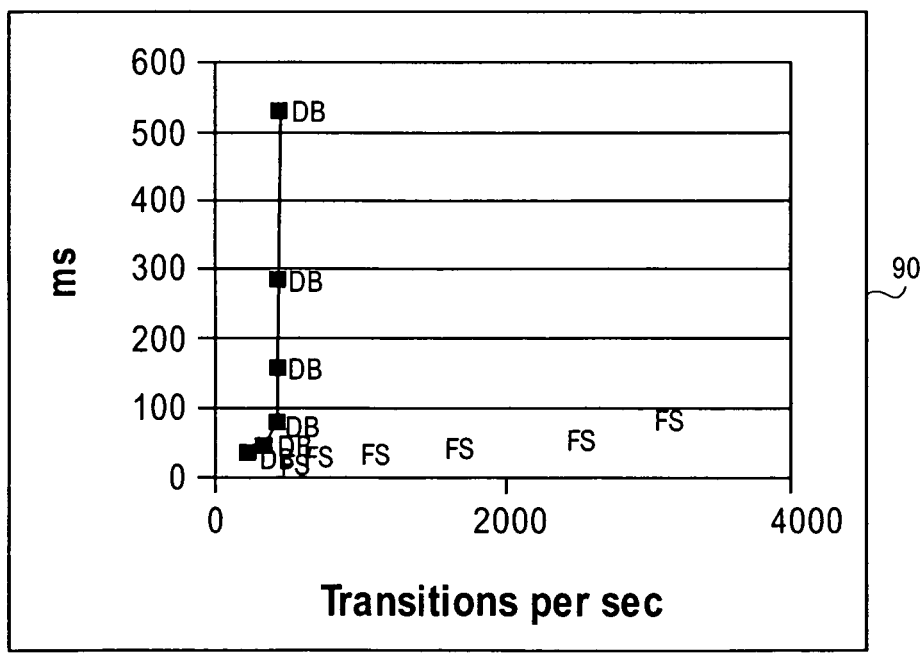
FIG. 6 shows a graph of workflow application performance in accordance with an embodiment of the invention.

The second benchmark, illustrated in FIG. 6, compares the performance of an asynchronous workflow application using the filestore with that application using a database. The application has a standard three-tier architecture: clients submit requests to a cluster of application servers which have access to a shared database. Each application server instance has its own local filestore. This benchmark uses an Oracle 9.2 database. The database machine is a 16-way 750-MHz Sun E6800 running Solaris 2.9 with 8 G of memory. The database uses four disks configured for Raid 0. The application server is a WebLogic Server 9.0. The application server machines are 2-way 933 MHz Intel Pentium processors with 1 G of memory. The filestore uses a single 10 K RPM disk. The load is generated by WebLogic messaging clients. The clients run on a 4-way 2.8 GHz Intel Pentium processor with 4 G of memory. Clients send messages to queues maintained by the application servers. The application servers process each message by dequeuing it, synchronously updating some associated workflow state, and then queuing a response message. The clients then receive these response messages. The benchmark measures the duration on the client from the send to the receive, called a workflow transition. The messages and the workflow state are maintained either in the filestore or the database. FIG. 6 shows a graph 90 of workflow application performance in accordance with an embodiment of the invention. In particular, FIG. 6 shows the average duration in milliseconds of workflow transitions as a function of throughput in a four server cluster, where throughput is varied by changing the number of clients: 8, 16, 32, 64, 128, and 256. The data-base limits the system to about 500 transitions per second, where even 256 client threads achieved only 482 transitions per second. With the filestore, comparable through-put was achieved with only 16 clients and 256 clients achieve 2996 transitions per second. The extent of the difference is due to several factors. The disk-scheduled writes result in very fast transactions. All four servers compete for a single database. In the database case the implementation incurs the cost of a two-phase commit to coordinate the separate resource managers for state and messages.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, while the embodiments of the systems and methods described above are described in the context of a WebLogic server, it will be evident that the system and methods may be used with other types of application servers, servers, and transactional applications, and messaging systems. Furthermore, while some embodiments of the systems and methods described above include a filestore, it will be evident that the disk scheduling algorithms can be used with other disk access techniques in addition to or instead of a filestore. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for scheduling disk writes in a transaction system, comprising:
   a server that includes an application executing thereon;
   a disk that is used by said application to store data;
   a disk head that operates in conjunction with said disk and writes said data onto blocks on said disk; and
   a disk scheduler that operates within said application, is independent of underlying operating system of said server, schedules sequential writes by said application to said disk;
   wherein said disk scheduler schedules the writes by
      repeatedly monitoring and determining lapsed time between completion of one write and start of actual transfer of data to said disk of next following write,
      repeatedly monitoring and determining variable block speed of said disk, and
      repeatedly selecting for writing onto, blocks on said disk that are about to rotate under said disk head at the end of a time period that is equal to said lapsed time based on said variable block speed, skipping other blocks that pass under said disk head during said time period.

2. The system of claim 1 wherein said disk scheduler performs the steps of
   determining a time ($\Delta T$) that elapsed between the completion of the last write to the disk and the issuing of the next write to the disk; and
   computing the block on the disk at which to issue the next write in terms of an increment ($\Delta B$) beyond the block at which the last write ended.

3. The system of claim 1 wherein said disk scheduler models the value for $\Delta B$ as a linear function of $\Delta T$.

4. The system of claim 3 wherein the value for $\Delta B$ is governed by the equation $$\Delta B = (C + \Delta T) * L$$

wherein the variable C represents the amount of time that elapses between the issuing of a write and the start of the actual transfer of data to the disk, and wherein the variable L represents the block speed of the disk or the number of blocks that pass under the disk head per unit of time.

5. The system of claim 4 wherein the disk scheduling algorithm continuously adjusts the values for C and L to optimize the writing of data to the disk.

6. The system of claim 5 wherein the value for C is taken to be the minimum of all observed writes to the disk.

7. The system of claim 5 wherein the value for L is readjusted probabilistically after each write to the disk, wherein if a write appears to have required a full rotation, the value for L is increased, and, if a write appears to have required less than a full rotation but is significantly slower than the best observed write, the value for L is decreased.

8. A method for scheduling disk writes in a transaction system, comprising the steps of:
   providing a server that includes an application executing thereon;
   writing data for said application to a disk, using a disk head; and
   scheduling sequential writes by said application to said disk, by using a disk scheduler that
      repeatedly monitors and determines lapsed time between completion of one write and start of actual transfer of data to said disk of next following write,
      repeatedly monitors and determines variable block speed of said disk, and
      repeatedly selects, for writing onto, blocks on said disk that are about to rotate under said disk head at the end of a time period that is equal to said lapsed time based on said variable block speed, skipping other blocks that pass under said disk head during said time period,
   wherein said disk scheduler operates within said application and is independent of underlying operating system of said server.

9. The method of claim 8 wherein said disk scheduler performs the steps of
   determining a time $\Delta T$ that elapsed between the completion of the last write to the disk and the issuing of the next write to the disk; and
   computing the block on the disk at which to issue the next write in terms of an increment $\Delta B$ beyond the block at which the last write ended.

10. The method of claim 8 wherein said disk scheduler models the value for $\Delta B$ as a linear function of $\Delta T$.

11. The method of claim 10 wherein the value for AB is governed by the equation $$\Delta B = (C + \Delta T) * L,$$

wherein the variable C represents the amount of time that elapses between the issuing of a write and the start of the actual transfer of data to the disk, and wherein the variable L represents the block speed of the disk or the number of blocks that pass under the disk head per unit of time.

12. The method of claim 11 wherein the disk scheduling algorithm continuously adjusts the values for C and L to optimize the writing of data to the disk.

13. The method of claim 12 wherein the value for C is taken to be the minimum of all observed writes to the disk.

14. The method of claim 12 wherein the value for L is readjusted probabilistically after each write to the disk, wherein if a write appears to have required a full rotation, the value for L is increased, and, if a write appears to have required less than a full rotation but is significantly slower than the best observed write, the value for L is decreased.

15. A computer readable medium including instructions stored thereon which when executed cause the computer to perform the steps of:
   providing a server that includes an application executing thereon;
   writing data for said application to a disk, using a disk head; and
   scheduling sequential writes by said application to said disk, by using a disk scheduler that
      repeatedly monitors and determines lapsed time between completion of one write and start of actual transfer of data to said disk of next following write,
      repeatedly monitors and determines variable block speed of said disk, and
      repeatedly selects, for writing onto, blocks on said disk that are about to rotate under said disk head at the end of a time period that is equal to said lapsed time based on said variable block speed, skipping other blocks that pass under said disk head during said time period,
   wherein said disk scheduler operates within said application and is independent of underlying operating system of said server.

16. A system for scheduling disk writes in a transaction system, comprising:
   a server that includes an application executing thereon;
   a disk that is used by said application to write data; and a disk scheduler that operates within said application, is independent of underlying operating system of said server, schedules sequential writes by said application to said disk;

wherein said disk scheduler schedules the writes by repeatedly monitoring and determining lapsed time between completion of one write and start of actual transfer of data to said disk of next following write, repeatedly monitoring and determining variable block speed of said disk, and repeatedly selecting for writing onto, blocks on said disk that are about to rotate under said disk head at the end of a time period that is equal to said lapsed time based on said variable block speed, skipping other blocks that pass under said disk head during said time period.

* * * * *

UNITED STATES PATENT AND TRADEMARK OFFICE
CERTIFICATE OF CORRECTION

PATENT NO. : 7,523,256 B2 Page 1 of 1
APPLICATION NO. : 11/343979
DATED : April 21, 2009
INVENTOR(S) : Gallagher et al.

It is certified that error appears in the above-identified patent and that said Letters Patent is hereby corrected as shown below:

On face page, in field (54), in "Title", in column 1, line 3, delete "OF" and insert -- OR --, therefor.

In column 1, line 3, delete "OF" and insert -- OR --, therefor.

In column 3, line 46, delete "3th" and insert -- 3rd --, therefor.

In column 6, line 20, delete "de-creased" and insert -- decreased --, therefor.

In column 10, line 18, in claim 10, delete "forΔB" and insert -- for ΔB --, therefor.

In column 10, line 19, in claim 11, delete "AB" and insert -- ΔB --, therefor.

Signed and Sealed this

Twenty-fifth Day of May, 2010

David J. Kappos
*Director of the United States Patent and Trademark Office*